May 16, 1939.  A. S. PIERREL  2,158,946
EVAPORATOR
Filed Sept. 7, 1937  2 Sheets-Sheet 1
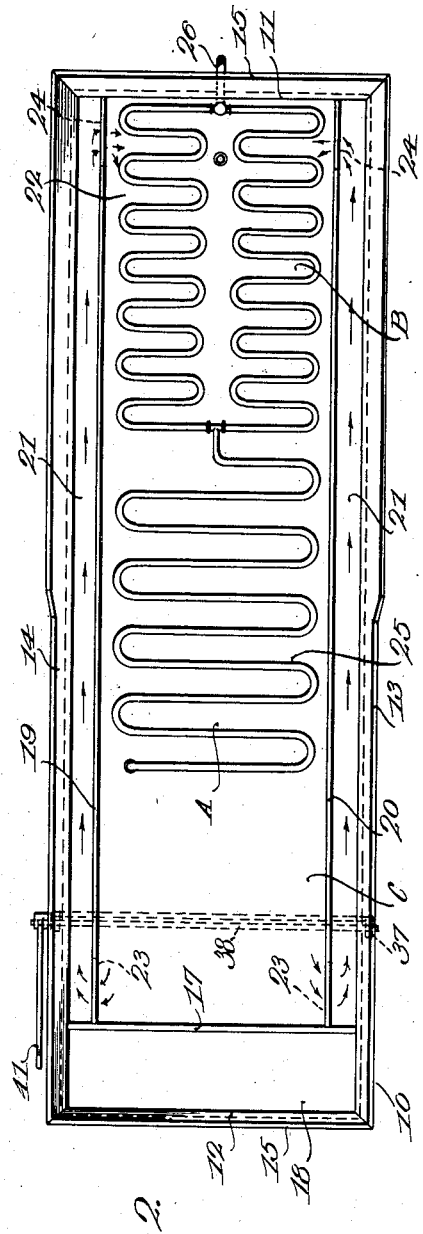
Inventor
Anthony S. Pierrel May 16, 1939.  A. S. PIERREL  2,158,946
EVAPORATOR
Filed Sept. 7, 1937  2 Sheets-Sheet 2
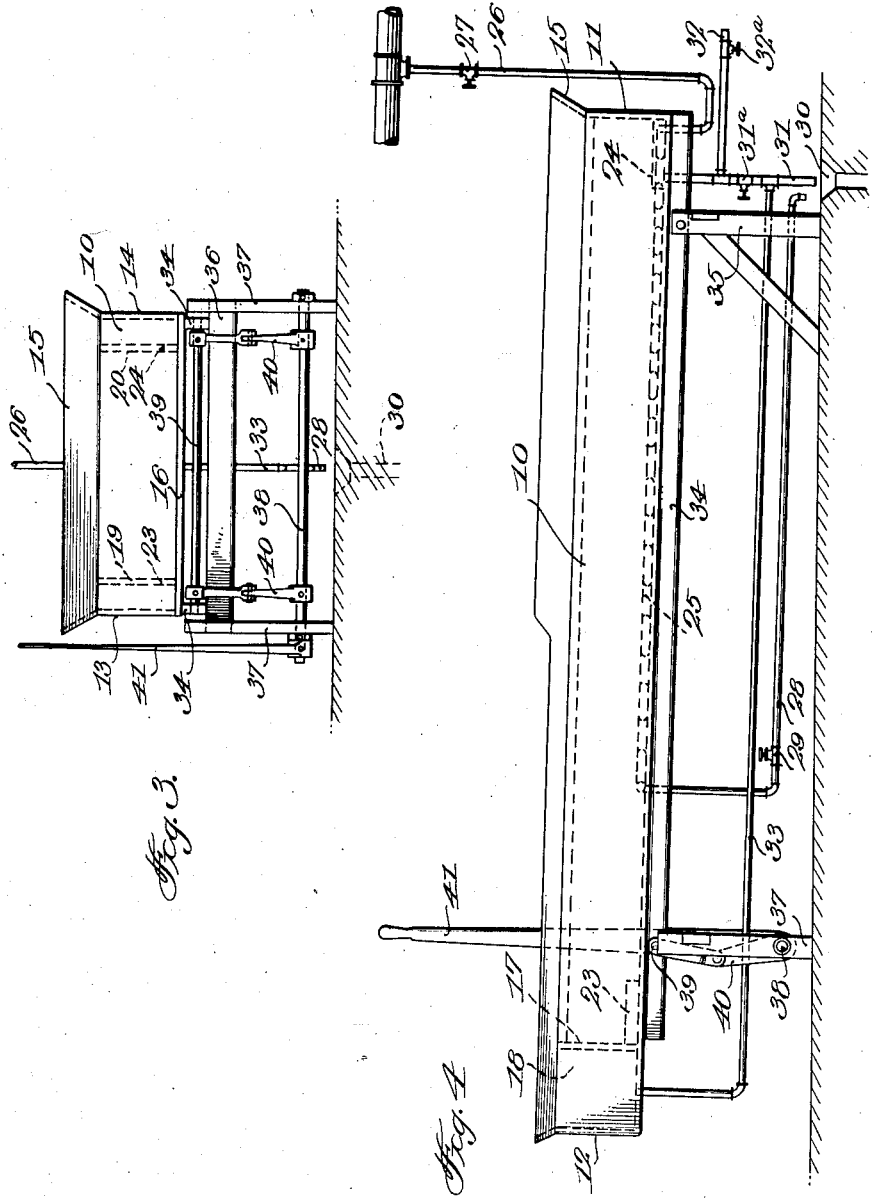
Inventor
Anthony S Pierrel
By
Attorney

Patented May 16, 1939

2,158,946

UNITED STATES PATENT OFFICE 2,158,946

EVAPORATOR

Anthony S. Pierrel, Washington, La.

Application September 7, 1937, Serial No. 162,745

3 Claims. (Cl. 159—34)

This invention relates to evaporating pans such as are used for treating sap, and more particularly to such pans as are used for the treatment of the sap or juice of sugarcane for the manufacture of syrup therefrom.

Sugarcane juice as it comes from the mill is a highly complex emulsion, and to separate the undesirable element therefrom, in making syrup, is difficult. The objectionable matter, which must be removed from the cane juice, is in a colloid state and, when the juice is heated to the boiling point, this matter rises to the surface as a frothy scum and must be skimmed off. For best results, this skimming operation should extend over the entire boiling range to evaporate from raw juice to the finished syrup, and the work should be carried on where the surface of the juice is calm and free from agitation or "bubbling up" resulting from the boiling.

The principal object of the invention, therefore, is to provide an evaporating pan having a portion or zone provided with means for heating the juice to the desired temperature, a zone to which the heated juice will flow and present a calm surface for the skimming operation, and means for constantly circulating the juice from the skimming zone to the heating zone.

A further object is to provide means whereby the intensity and extent of the heat applied to the juice may be controlled.

Another object of this invention is to provide means whereby the pan may be tilted to cause all of the juice to flow to the heating means for the final step of the evaporating process and also to facilitate the draining of the completed syrup from the pan.

Other objects and advantages will be apparent from the following specifications when taken in connection with the accompanying drawings, in which Figure 1 is a vertical longitudinal section of the device in the position occupied at the beginning of and during the skimming operation, Figure 2 is a plan view of the device, Figure 3 is an end view of the same when in the position shown in Figure 1, and Figure 4 is a side elevation in the position occupied at the end of the period of operation, certain parts being indicated in dotted lines.

Referring to the drawings, 10 designates the evaporating pan proper which includes end walls 11 and 12 and side walls 13 and 14, the upper portions of which are flared outwardly as at 15, also a bottom wall 16. Spaced inwardly from the end wall 12 is a vertical transverse partition 17 to provide an end compartment or slop trough 18, the purpose of which will be described later herein, and extending from the end wall 11 to the partition 17, at opposite sides of the pan, are vertical partitions 19 and 20 to provide longitudinal channels 21.

The lower edge of each of the partitions 19 and 20, at both ends, is cut away to provide passages by means of which the channels communicate with the inner or major compartment 22 of the pan, the passages adjacent the partition 17 being numbered 23 and those adjacent the end wall 11 being numbered 24.

Positioned within and resting on the bottom of the major compartment 22 is a heating unit comprising a steam pipe coil 25 having one end spaced somewhat from the partition 17 and the other end extending to the end wall 11 where it is connected to a steam supply pipe 26, which leads to a suitable boiler, not shown, and which is provided with a cut-off valve 27. The opposite end of the pipe coil is connected to an outlet pipe 28 which passes through the bottom of the pan 10 and is provided with a control valve 29. If desired, the handles of the valves 27 and 29 may be extended so as to bring them within reach of the operator who will be positioned near the slop trough 18.

The pipes 26 and 28 empty into a suitable drain 30. It will be noted that the heating unit comprising the coil 25, which occupies that portion of the pan which will be referred to as the heating zone, is divided into two approximately equal sections designated as A and B, the latter of which is positioned adjacent the end wall 11 of the pan and includes a greater length of pipe than the former. As a result, the juice surrounding the coils of section B will be heated to a greater degree than that surrounding the coils of section A, while that portion of the juice occupying the portion C of the pan into which the heating element does not extend will not be in contact with any of the heating coils and will, therefore, not boil. This portion of the pan will be referred to as the skimming zone. The juice therein will present a calm and unruffled surface during the evaporating process, due to the absence of heating coils, such a surface being essential to the successful removal of the scum. This arrangement of the coils and the provision of the skimming zone play an important part in the operation of the device.

Communicating with the pan 10 through its bottom and adjacent the end wall 11 is a drain pipe 31 having a cut-off valve 31a between which and the pan is connected a pipe 32 having a shutoff valve 32a. At a point beyond the valve 31a, the pipe 31 is connected to a pipe 33 which communicates with the slop trough 18.

The pan is mounted on sills 34 which extend longitudinally beneath its bottom and near the outer edges thereof. Near their forward ends, these sills are pivoted to the upper ends of legs 35, while their rear portions rest on a cross member 36 which connects legs 37. Passing through these legs is a rock shaft 38 and connected to and extending between the sills 34 is a shaft 39. Connected to these shafts are the ends of toggle-levers 40, and secured to an end of the shaft 38 is an operating lever 41. It will thus be seen that, by means of the lever 41, the shaft 38 may be rocked which will cause the toggle-levers 40 to raise the adjacent or rear end of the pan so that it will incline downwardly towards its end wall 11, as shown in Figure 4.

The operation of the device is as follows:

With the evaporating pan in horizontal position as shown in Figure 1, the valves 31a and 32a being closed, it is supplied with cane juice in any suitable manner to a depth of about eleven inches or up to the line indicated at 42, the density of the juice being about 4 Baumé. The valve 29 is next opened wide as is also the valve 27 so as to cause a column of steam to pass through the pipe 26 thence to and through the pipe coil 25 of the heating element and out through the pipe 28. The juice should then start to boil in about ten minutes, after which it is permitted to boil until its density is about 10 Baumé. The steam inlet valve 27 is then shut down until the heat of the coil 25 is so reduced as to cause the juice to foam. The valve 29 is then regulated to trap a sufficient amount of condensed steam in the coils of section A of the heating element to cause the foaming to cease in the skimming zone C, so that the juice therein will present a smooth surface. When the device has been thus adjusted and foaming is in progress, the foam will rise to a greater height over the coils of section B of the heating element, due to the greater heat at that point, and will cascade down towards the other or cooler end, as indicated by the dotted line 43, and into the skimming zone. The foaming of the juice causes the objectionable matter contained therein to rise to the surface as a scum which is carried along on the cascading frothy surface until it reaches the calm surface of the skimming zone. Here the scum is removed with a hand skimmer and is deposited in the slop trough 18 from which it flows through the pipe 33 to the drain 30.

After the cascading juice has reached the skimming zone, where foaming ceases, it flows laterally in opposite directions through the passages 23 into and along the channels 21, thence through the passages 24 and again into contact with the hot coils of section B of the heating element. It will be noted that the passages 23 are so low as to prevent the scum on the surface of the juice from passing therethrough and into the channels 21.

Cane juice contains objectionable matter of several densities and each will rise to the surface, as scum, when the boiling juice reaches a density greater than the matter in suspension, the last matter to rise being cane wax which comes to the surface when the juice reaches a density of 25 Baumé to 30 Baumé. The evaporating process is, therefore, carried on in stages during each of which matter of a particular kind will rise and be removed.

After this foaming has been carried on for about twenty minutes, the juice is approximately 20 Baumé, and most of the scums that rise at this density have been removed. The valves 27 and 29 are then again opened so as to cause the juice to boil for another period of about twenty minutes, after which the foaming operation is again brought about by the partial closing of said valves as already explained, and the scum which has then risen to the surface is skimmed off and deposited in the slop trough 18.

The scums rise to the surface while the juice is boiling briskly, but can be effectively removed only during the foaming operation, the last of which takes place when the juice is from 30 Baumé to 32 Baumé. Immediately after this final skimming operation, the lever 41 is operated to raise the rear end of the apparatus so that it will incline downward towards its end 11, as shown in Figure 4. The valves 27 and 29 are then again opened wide and the juice is rapidly boiled to 36 Baumé. The steam valve 27 is then closed and the valve 32a opened to drain off the finished syrup through the pipe 32.

It will be noted from the foregoing description that during the entire operation of this device, the juice is in constant circulation from section B of the heating element, thence over the coils of section A to the skimming zone C, and outwardly therefrom through the passages 23 to and along the channels 21, then through the passages 24 to the starting point. The juice is thus repeatedly presented to the steam pipe coils of the heating element, causing the scums to rise progressively as the juice becomes more dense, and flow to the skimming zone for removal. The charge of juice is thereby gradually and effectively worked down to the finished syrup.

What is claimed is:

1. A device of the class described comprising a pan adapted to contain juice, an element for heating the juice, said pan having a heating zone occupied by the heating element and a skimming zone unoccupied thereby, the heated juice being adapted to flow from the heating zone to the skimming zone, and a longitudinal partition extending upwardly from the bottom of the pan adjacent one of its sides and parallel therewith, whereby to form a channel extending from the skimming zone to the heating zone, said partition extending above the contents of the pan and having passages through its lower portion adjacent each end, whereby to permit juice to flow into the channel from the skimming zone and out of said channel into the heating zone.

2. A device of the class described comprising a pan adapted to contain juice, a pipe coil within the pan for heating the juice and extending longitudinally of the pan for a portion of its length whereby to provide a heating zone and a skimming zone, means constructed and arranged to convey a column of steam to the pipe coil, an outlet for the coil, means for controlling said column of steam and said outlet whereby to govern the extent of the heat radiating surface of the coil and a longitudinal partition extending upwardly from the bottom of the pan adjacent one of its sides and parallel therewith, whereby to form a channel extending from the skimming zone to the heating zone, said partition extending above the contents of the pan and having passages through its lower portion adjacent each end, whereby to permit juice to flow into the channel from the skimming zone and out of said channel into the heating zone.

3. A device of the class described comprising a pan adapted to contain juice, an element for heating the juice, said pan having a heating zone occupied by the heating element and a skimming zone unoccupied thereby, the heated juice being adapted to flow from the heating zone to the skimming zone, and a longitudinal partition extending upwardly from the bottom of the pan adjacent each of its sides and parallel therewith, whereby to form channels extending from the skimming zone to the heating zone, each of said partitions extending above the contents of the pan and having passages through their lower portions and adjacent each end thereof, whereby to permit juice to flow into the channels from the skimming zone and out of the channels into the heating zone.

ANTHONY S. PIERREL.